United States Patent [19]
Takei

[11] Patent Number: 5,476,324
[45] Date of Patent: Dec. 19, 1995

[54] SPLINE BEARING

[75] Inventor: Seiji Takei, Kanagawa, Japan

[73] Assignee: Nippon Thompson Co., Ltd., Tokyo, Japan

[21] Appl. No.: 243,834

[22] Filed: May 17, 1994

[30] Foreign Application Priority Data

May 25, 1993 [JP] Japan ................ 5-032528 U

[51] Int. Cl.$^6$ ........................................ F16C 29/06
[52] U.S. Cl. ...................... 384/8; 384/43; 384/448
[58] Field of Search ........................... 384/8, 43, 44, 384/45, 448; 464/168

[56] References Cited

U.S. PATENT DOCUMENTS 5,008,947  4/1991  Yamada ........................... 384/44
5,221,145  6/1993  Borel ............................... 384/43
5,240,331  8/1993  Ninomiya ........................ 384/45

Primary Examiner—Lenard A. Footland
Attorney, Agent, or Firm—Sughrue, Mion, Zinn, Macpeak & Seas; Richard C. Turner

[57] ABSTRACT

A spline bearing is described which contributes to reducing the size and cost of the apparatus, such as an industrial robot, in which it is incorporated, and moreover, has a high degree of reliability of relative positioning of a spline shaft and outer cylinder.

The above-mentioned advantages are obtained by forming a detected portion along a track groove of the spline shaft, and providing a detection device which detects that detected portion on the outer cylinder.

12 Claims, 11 Drawing Sheets

SPLINE BEARING

BACKGROUND OF THE INVENTION

1. Field of the Invention

The present invention relates to a spline bearing.

2. Description of the Prior Art

A ball spline is shown in FIGS. 1 through 3 as an example of a spline bearing of the prior art.

In the drawings, six linear track grooves 1a are formed mutually in parallel along the lengthwise direction in spline shaft 1, and outer cylinder 2 is fit loosely on said spline shaft 1. An identical number as the number of above-mentioned track grooves 1a, namely six, of rolling element circulating paths (to be later described in detail) are formed corresponding to each of track grooves 1a in this outer cylinder 2. A large number of rolling elements in the form of balls 3 are arranged and contained within these rolling element circulating paths. Each ball 3 circulates by rolling over the above-mentioned track groove 1a accompanying relative motion of spline shaft 1 and outer cylinder 2, thereby bearing the load between spline shaft 1 and outer cylinder 2.

Outer cylinder 2 has cylindrical outer cylinder body 5, a pair of end caps 6 each formed into a circular shape and coupled to both ends of said outer cylinder body 5 by fitting inside, and seals 7 attached to the outside surfaces of both of said end caps 6. However, only the end cap 6 and seal 7 on one side are shown in the drawings (FIG. 1).

As is clear from FIGS. 1 and 2, the rolling element circulating paths described above are composed of load bearing track grooves 9a, namely load bearing tracks, and return paths 9b, each formed linearly and mutually in parallel in outer cylinder 5, and pairs of semi-circular direction changing paths 9c (see FIG. 1) which connect these at both ends. Furthermore, the above-mentioned load bearing track grooves 9a oppose track grooves 1a of spline shaft 1.

Ball splines having the above-mentioned constitution are used, for example, in mechanical portions to be made to perform linear relative motion while simultaneously bearing a radial load and torque such as in industrial robots and transfer machines.

In the case of apparatuses requiring an extremely high degree of operating accuracy as in the manner of industrial robots and so forth, it is necessary to detect the relative positions of spline shaft 1 and outer cylinder 2 with high precision. A device composed of long linear scale 11 and sensor 12 as shown in FIG. 1 are additionally provided as a position detection device for this purpose. This linear scale 11 is, for example, magnetized with a large number of magnetic poles minutely arranged in its lengthwise direction. In the case of, for example, using spline shaft 1 for the fixed side, linear scale 11 is fixed with respect to said spline shaft 1. In addition, since sensor 12 is composed of a magnetic sensor, it is mounted on outer cylinder 2.

As is clear from the above, in the spline bearing of the prior aft, the amount of space occupied by the parts that compose the position detection device provided to detect the relative positions of the spline shaft and outer cylinder is large, while said position detection device is also relatively expensive. Thus, this results in a problem that must be solved in terms of attempting to reduce the size and lower the cost of an industrial robot and so forth in which it is to be incorporated.

In addition, since the above-mentioned spline bearing is mounted by means of brackets and so forth on a prescribed base member (not shown), and linear scale 11 is also mounted to said base member by means of brackets and so forth, a large number of members, including this base member, brackets and so forth, are mechanically juxtaposed between spline shaft 1 and linear scale 11. Accordingly, even if it is attempted to set the detection accuracy achieved with the above-mentioned position detection device at a high level, it was not always easy to increase the reliability of relative positioning of spline shaft 1 and outer cylinder 2 due to the effects of the mounting errors and so forth between each of these members.

SUMMARY OF THE INVENTION

Therefore, in consideration of the above-mentioned disadvantages of the prior art, the object of the present invention is to provide a spline bearing that contributes to reducing the size and lowering the cost of apparatuses such as individual robots and so forth in which it is to be incorporated, while also having a high degree of reliability of relative positioning of a spline shaft and outer cylinder.

The spline bearing according to the present invention comprises: a spline shaft in which tracks are formed in the lengthwise direction; an outer cylinder able to freely perform relative motion with respect to said spline shaft and having rolling element circulating paths containing load bearing tracks corresponding to said tracks; and, a plurality of rolling elements arranged and contained in said rolling element circulating paths, which bear the load while rolling over said tracks; wherein, a detected portion is formed in said spline shaft along said tracks, and a detection device is provided on said outer cylinder which detects said detected portion.

DESCRIPTION OF THE PREFERRED EMBODIMENTS

Figure 1:
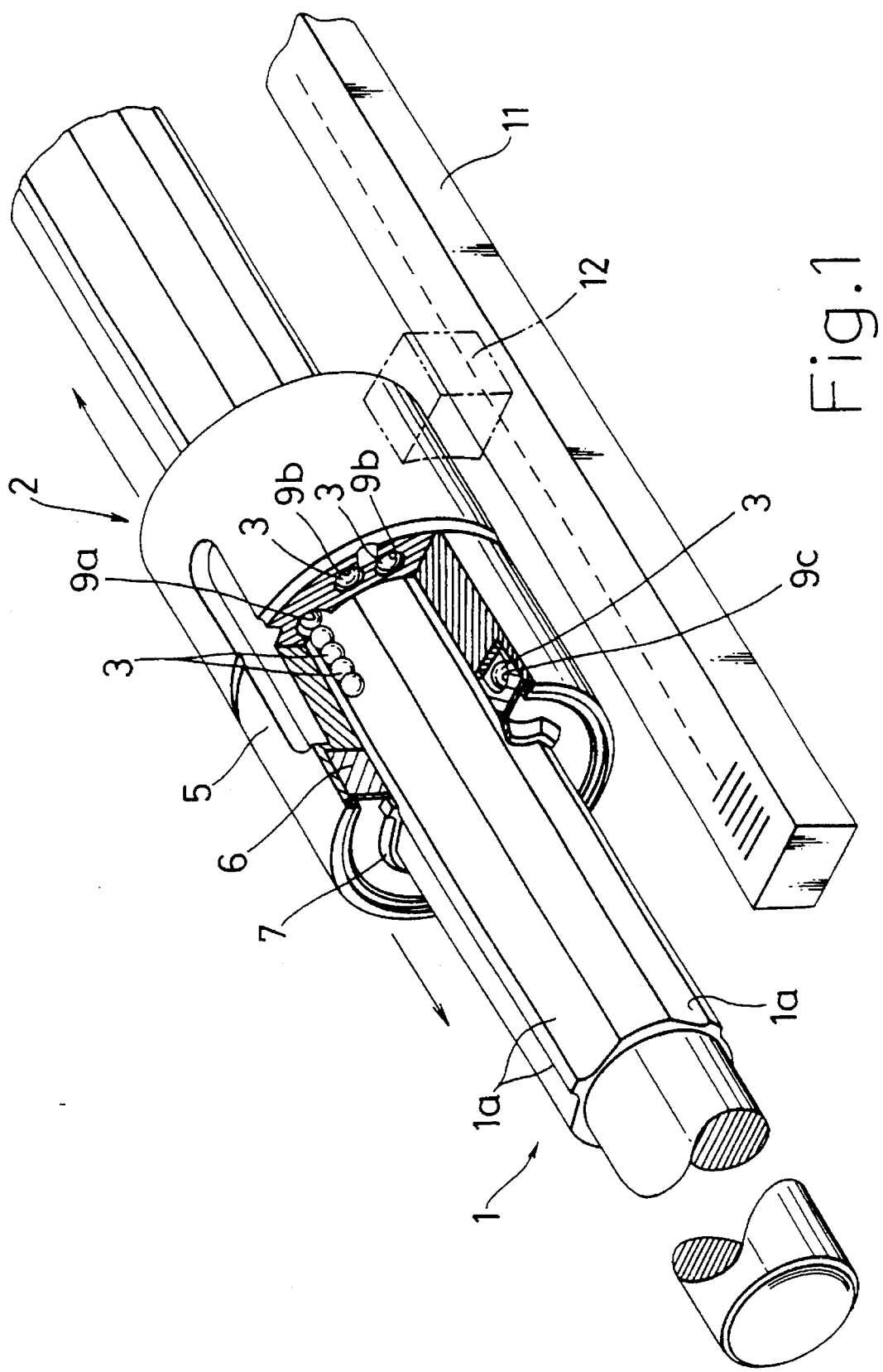
FIG. 1 is a perspective view showing a ball spline of the prior art and its peripheral members.
Figure 2:
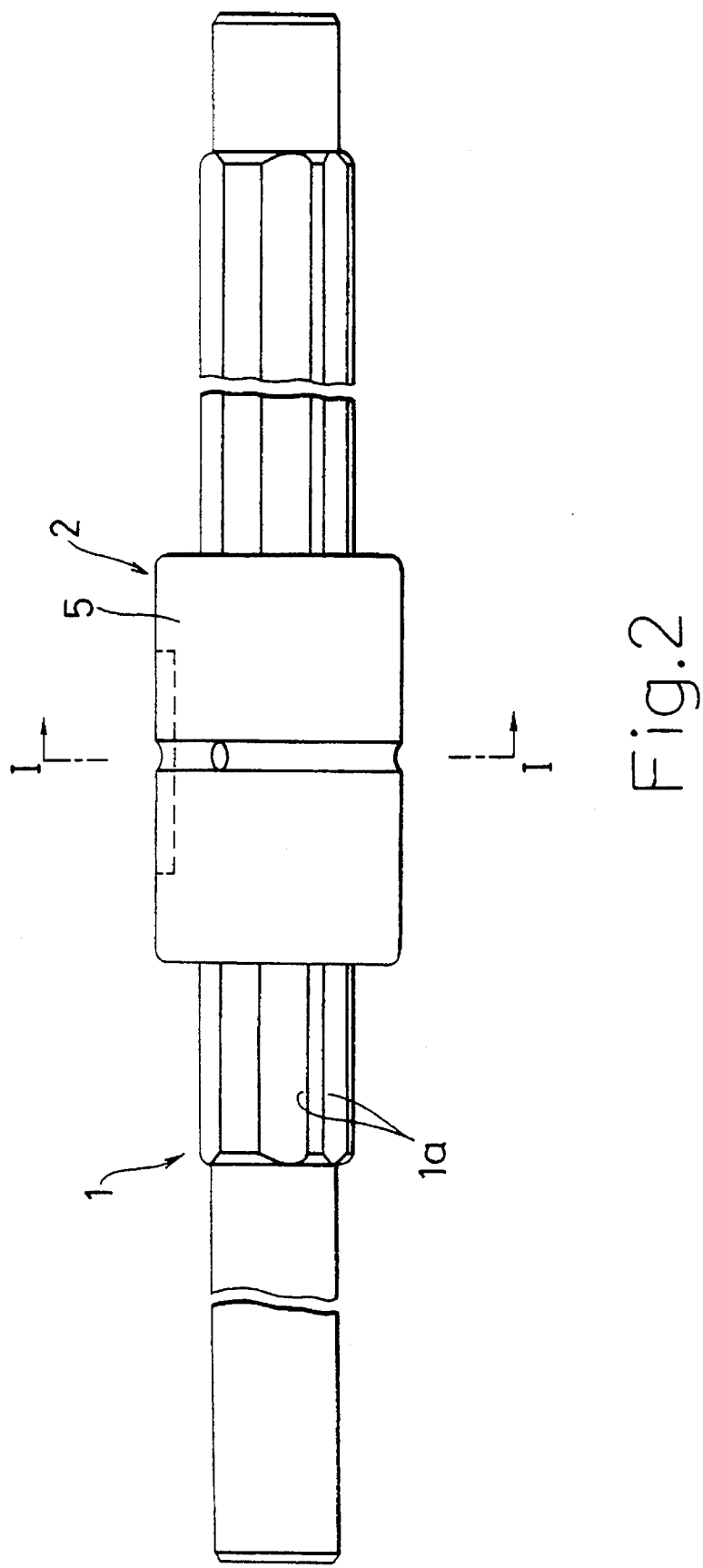
FIG. 2 is a side view of the ball spline shown in FIG. 1.
Figure 3:
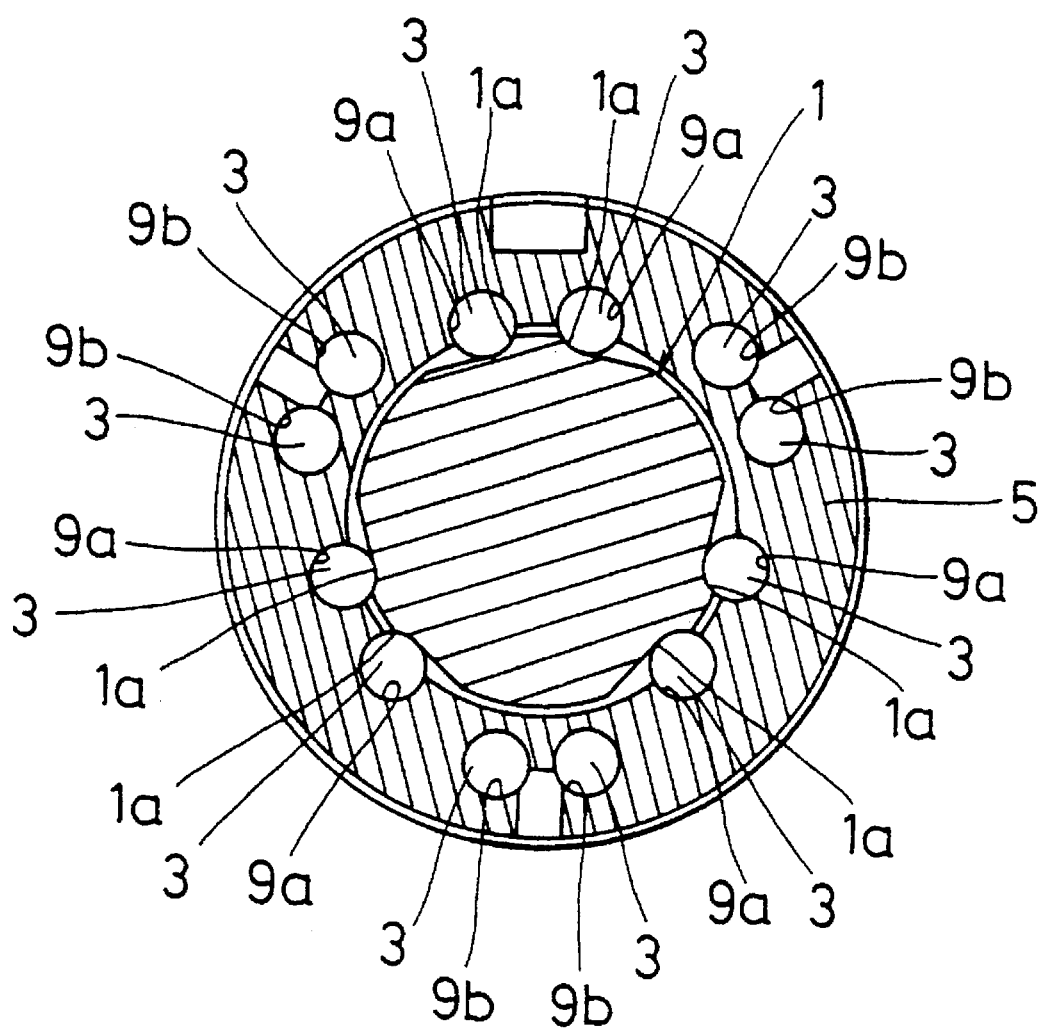
FIG. 3 is a vertical cross-sectional view of the ball spline shown in FIG. 1.

The following provides an explanation of the preferred embodiments of the present invention with reference to the drawings. Furthermore, since the ball splines described as each of the embodiments indicated below are composed in the same manner as the ball spline of the prior art shown in FIGS. 1 through 3 with the exception of those portions to be explained, an explanation of the entire ball spline will be omitted. In addition, in the following explanation, the same reference numerals will be used for those constituent members identical to the constituent members of said ball spline of the prior art.

Figure 4:
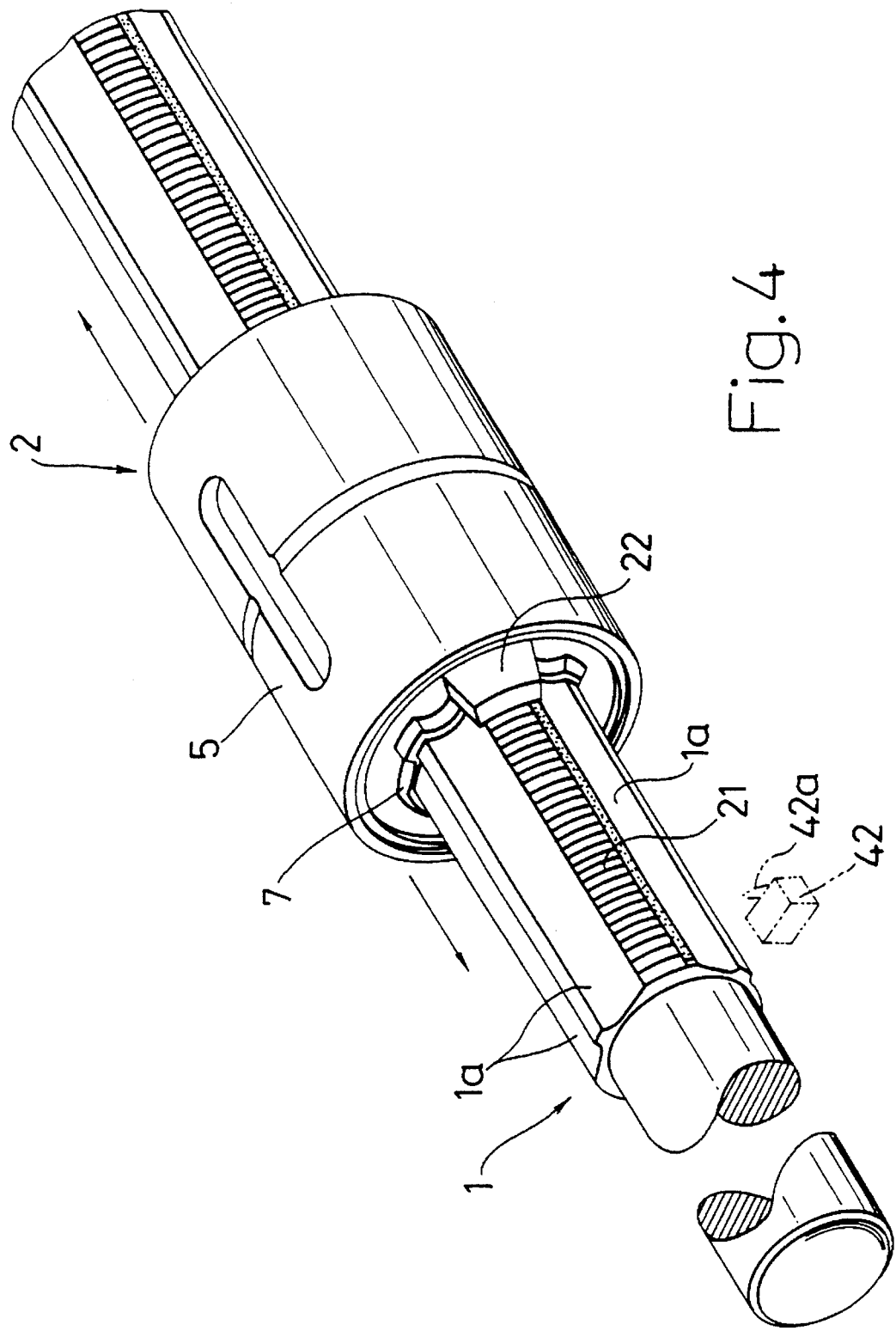
FIG. 4 is a perspective view of a ball spline as a first embodiment of the present invention.

FIG. 4 shows a ball spline as a first embodiment of the present invention.

As shown in the drawing, in said ball spline, detected portion 21 is formed along track grooves 1a of spline 1 between said track grooves 1a. A small case 22, containing a detection device (to be described later) which detects said detected portion 21, is attached to the end of outer cylinder 2.

Figure 5:
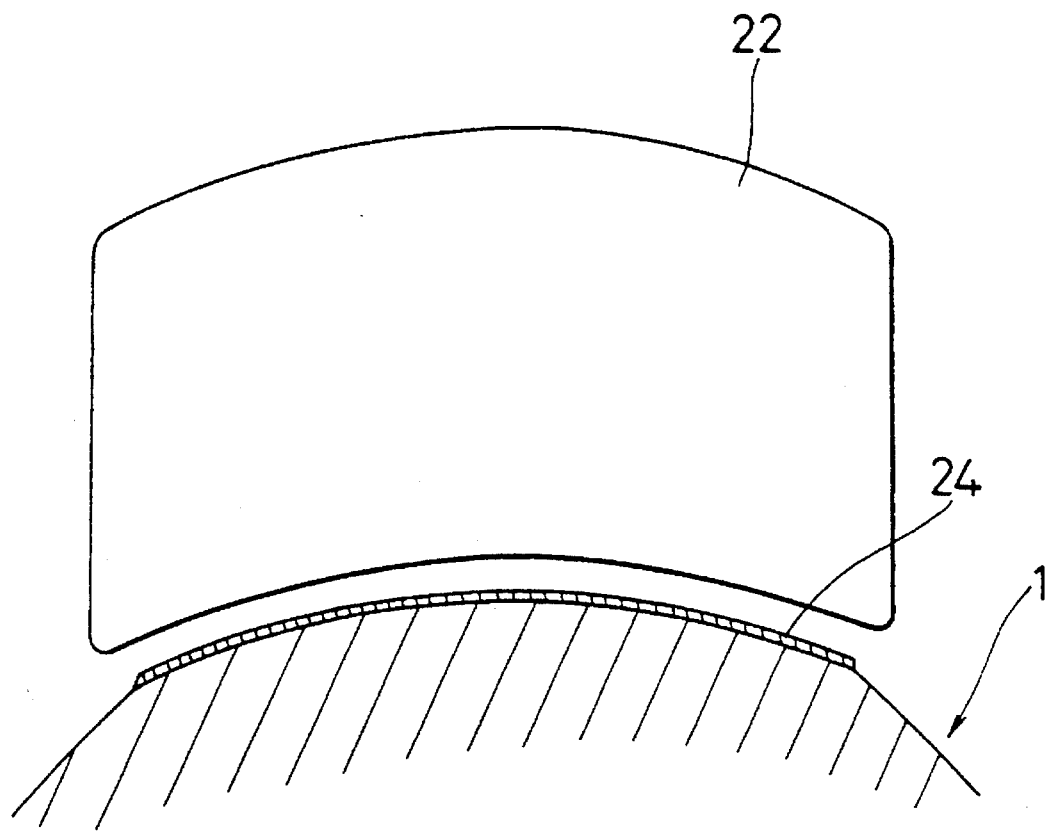
FIG. 5 is a vertical cross-sectional view of a portion of the ball spline shown in FIG. 4.

Magnetic film 24 is provided on the surface between track grooves 1a as shown in FIG. 5. The above-mentioned detected portion 21 is formed with respect to said magnetic film 24 so as to be magnetized in the manner described below. Furthermore, this magnetic film 24 is composed by coating a molten magnetizing agent between track grooves 1a of spline shaft 1 and solidifying. However, it is also possible to directly magnetize the surface layer portion of spline shaft 1 itself without forming magnetic film 24 in this manner. In addition, a magnetic film may also be formed by plating or sputtering.

Figure 6:
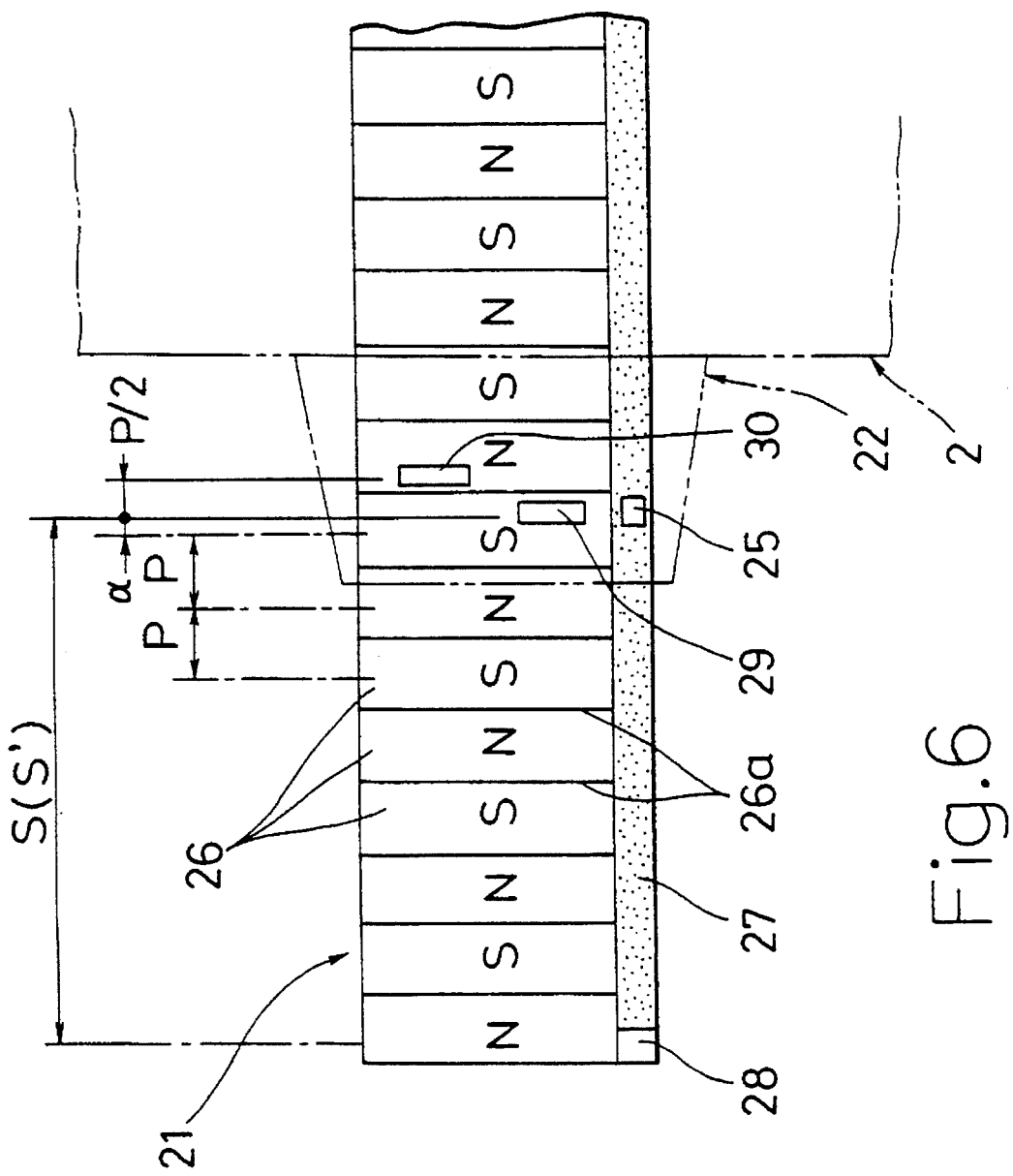
FIG. 6 is an overhead view showing the detected portion provided on the ball spline shown in FIG. 4 along with the detection device for detection of said detected portion.

FIG. 6 shows the above-mentioned detected portion 21 provided along track grooves 1a in detail.

As shown in the drawing, detected portion 21 is magnetized by a large number of magnetic poles along track groove 1a. In this case, N and S magnetic poles are minutely and alternately arranged and magnetized along track groove 1a for detection of position of the above-mentioned outer cylinder 2. Each of these magnetized portions is indicated with reference numeral 26 in FIG. 6. The non-magnetized portion is shown with hatching in dots and with reference numeral 27. As shown in this drawing, borders 26a in the direction along track groove 1a of each of these magnetized portions 26 is either perpendicular or roughly perpendicular to said track groove 1a. Furthermore, magnetized portion 28 is provided as the origin serving as a reference for measurement corresponding one of the above-mentioned magnetized portions 26 located on the outermost end.

On the other hand, the detection device, which detects the above-mentioned detected portion 21, provided within case 22 described above is composed of each of the magnetic sensors described below.

Namely, as shown in FIG. 6, said detection device is composed of two electromagnetic conversion elements 29 and 30, consisting of a Hall effect element and so forth, provided for detecting each of the above-mentioned magnetized portions 26, and a magnetic resistance (MR) element 25 for detecting magnetized portion 28 located at the origin.

Figure 7:
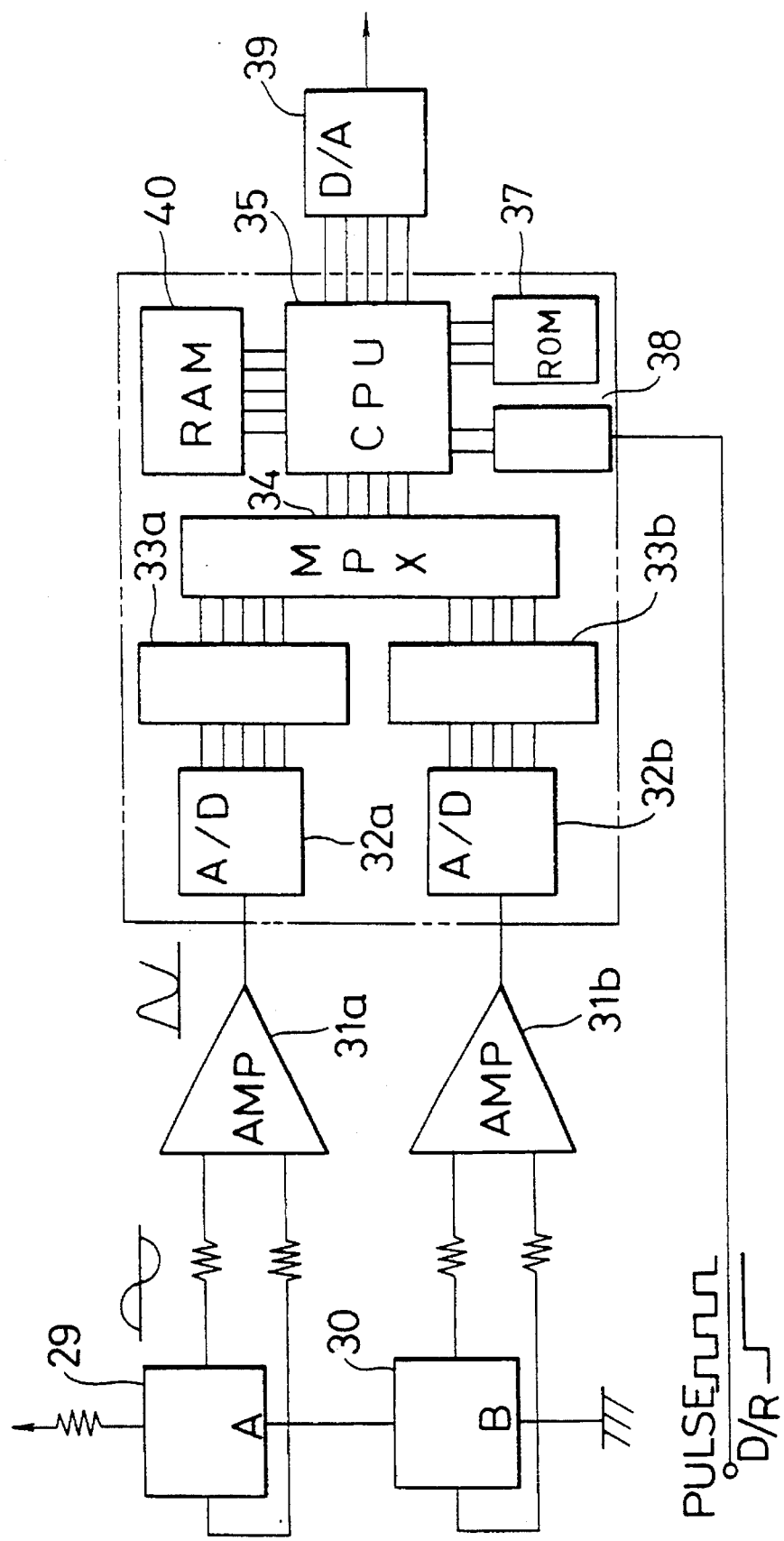
FIG. 7 is a block diagram of the control system for controlling operation of the ball spline shown in FIG. 4.
Figure 8A:
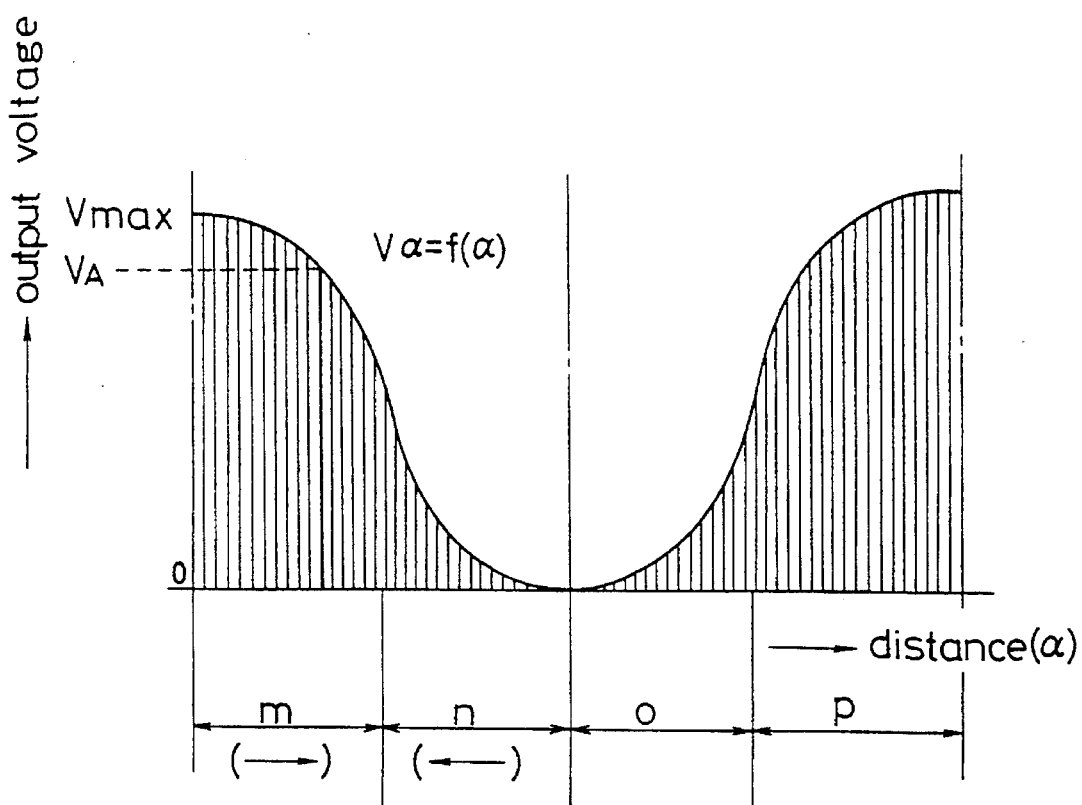
FIG. 8 consists of graphs showing the waveforms obtained from electromagnetic conversion elements equipped on the ball spline shown in FIGS. 4 through 6.

The above-mentioned electromagnetic conversion element 30 is provided shifted by ½ the pitch P between each of magnetized portions 26 with respect to electromagnetic conversion element 29. As a result, a waveform is obtained differing in phase by π/2 with respect to the waveform shown in FIG. 8(A). Furthermore, as shown in FIG. 8, although waveforms in the form of consecutive positive and negative sine waves based on a zero level are obtained from electromagnetic conversion elements 29 and 30, as shown in FIG. 7, these waveforms ape amplified from said zero level to the level of Vmax as a result of passing through amplification circuits 31a and 31b. This is done to facilitate later signal processing.

The following provides an explanation of the constitution of the control system for controlling the position of outer cylinder 2 based on the detection signals generated by the above-mentioned detection device.

As shown in FIG. 7, waveforms output from electromagnetic conversion elements 29 and 30 are input to amplification circuits 31a and 31b. These amplification circuits 31a and 31b are sequentially connected to A/D conversion circuits 32a and 32b, latching circuits 33a and 33b and multiplexer (MPX) 34. The output of this multiplexer 34 is then input to CPU (control circuit) 35. In addition, memory (ROM) 37, a counting device in the form of up-down counter 38, and D/A conversion circuit 39 are connected to CPU 35.

The above-mentioned A/D conversion circuits 32a and 32b convert the analog waveforms amplified in level by amplification circuits 31a and 31b of the preceding stage into binary data. This data is then respectively input to latching circuits 33a and 33b. These latching circuits 33a and 33b latch and hold the data of said A/D conversion circuits 32a and 32b in order to synchronize the data respectively converted by A/D conversion circuits 32a and 32b of the preceding stage. This held data is then input to multiplexer (MPX) 34. Since this multiplexer (MPX) 34 is unable to simultaneously output data latched by latching circuits 33a and 33b in the case of output to CPU 35 of the following stage, data is individually output to CPU 35 by time sharing where arithmetic processing is then performed on said data.

The following provides an explanation of the arithmetic processing performed by CPU 35.

For the initial operation, outer cylinder 2 is driven to move to the reference position followed by resetting of scale position data stored in memory (RAM) 40 in response to a signal generated resulting from the detection of the origin in the form of magnetized portion 28 by magnetic resistance element 25. Outer cylinder 2 begins to move to a prescribed position as a result of this reset command. In response to this operation, continuous waveforms differing in phase that have been amplified in level as shown in FIGS. 8(A) and 8(B) are obtained from electromagnetic conversion elements 29 and 30.

Figure 8B:
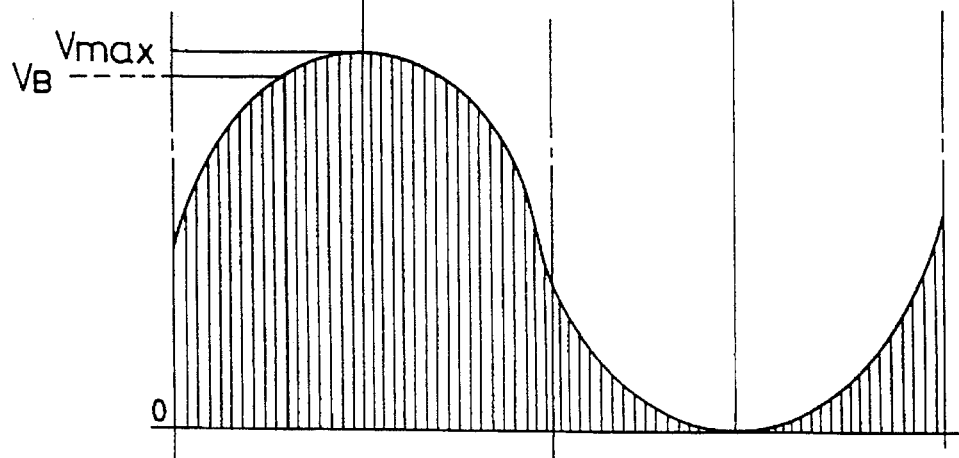

As shown in FIGS. 8(A) and 8(B), in looking, for example, at the region of m, it can be seen that the waveforms corresponding to the output data of electromagnetic conversion elements 29 and 30 differ between (A) and (B) in FIG. 8. As a result, CPU 35 is able to assess the direction of movement of outer cylinder 2 by comparing these differing sets of data.

Next, the amount of movement of outer cylinder 2 is determined in the following manner.

Namely, when the amount of movement with respect to detected portion 21 of electromagnetic conversion elements 29, 30 and magnetic resistance element 25 provided in case 22 in FIG. 6 is taken to be S, this value becomes the amount of movement of outer cylinder 2.

For example, when the output of electromagnetic conversion element 29 is taken to be $V_A$ and the output of electromagnetic conversion element 30 is taken to be $V_B$, the above-mentioned amount of movement S can be determined by determining the voltage ratio $V_A/V_B$ as shown in FIGS. 8(A) and 8(B). Although, for example, the voltages $\alpha \times V_A$ and $\alpha \times V_B$ are obtained due to changes in the gap between electromagnetic conversion elements 29 and 30 and each of magnetized portions 26 to be detected by these, there is the risk of arithmetic processing being performed as if outer cylinder 2 had actually moved despite there having been only a change in this gap. Therefore, in order to prevent this type of mechanical error, by performing processing in the form of $\alpha \times V_A/\alpha \times V_B$, $\alpha$ can be determined as $V_A/V_B$ unrelated to position data.

Whereupon, since minute position data within 1 pitch (P) corresponding to $V_A/V_B$ is stored in advance in memory 37, CPU 35 is able to determine distance $\alpha$ shown in FIG. 6 by reading from memory (ROM) 37 and comparing the value coinciding with the value of $V_A/V_B$ determined by the above-mentioned arithmetic processing. In the case of determining the position data of this determined distance $\alpha$, since previously determined position data is already stored in memory 40 (although not stored in memory when data is initially written from the above-mentioned reference position), CPU 35 adds the most recently determined distance $\alpha$ to said data and as a result, calculated distance S is written into memory 40 as position data.

By then repeating this type of arithmetic processing, the above-mentioned distance S is stored in the above-mentioned memory 40 as position data.

However, up-down counter 38 is connected to CPU 35 for counting the number of pulses applied by a control device not shown. This up-down counter 38 is composed so as to operate in response to reset commands of memory 40. In addition, since the number of pulses generated in 1 pitch (P) shown in FIG. 6 is determined in advance, CPU 35 is able to calculate distance S' by counting the number of pulses output from this up-down counter 38.

The amount of deviation is then determined by comparing this determined distance S' with distance S stored in the above-mentioned memory 40. CPU 35 then outputs this determined amount of deviation to D/A converter 39. Outer cylinder 2 is then driven to the prescribed position based on this output.

Furthermore, as is clear from FIG. 6, although each of magnetized portions 26 to be detected by the above-mentioned electromagnetic conversion elements 29 and 30 are formed leaving no space between them in the present embodiment, pitch P between each magnetized portion 26 may be set to be large by placing non-magnetized portions between these magnetized portions 26.

In addition, although magnetized portion 28 serving as the reference for measurement is additionally provided together with magnetized portions 26 for detection of movement between track grooves 1a of spline shaft 1 in the present embodiment, in the case the dimension of width between these track grooves 1a is relatively small making the providing of said magnetized portion 28 difficult, this may be overcome by, for example, providing the switch indicated with reference numeral 42 in FIG. 4 corresponding to the measurement reference position. Namely, as a result of outer cylinder 2 returning to the measurement reference position, it engages with activator 42a of switch 42 resulting in activation of said switch 42 and the generation of an original signal.

Figure 9:
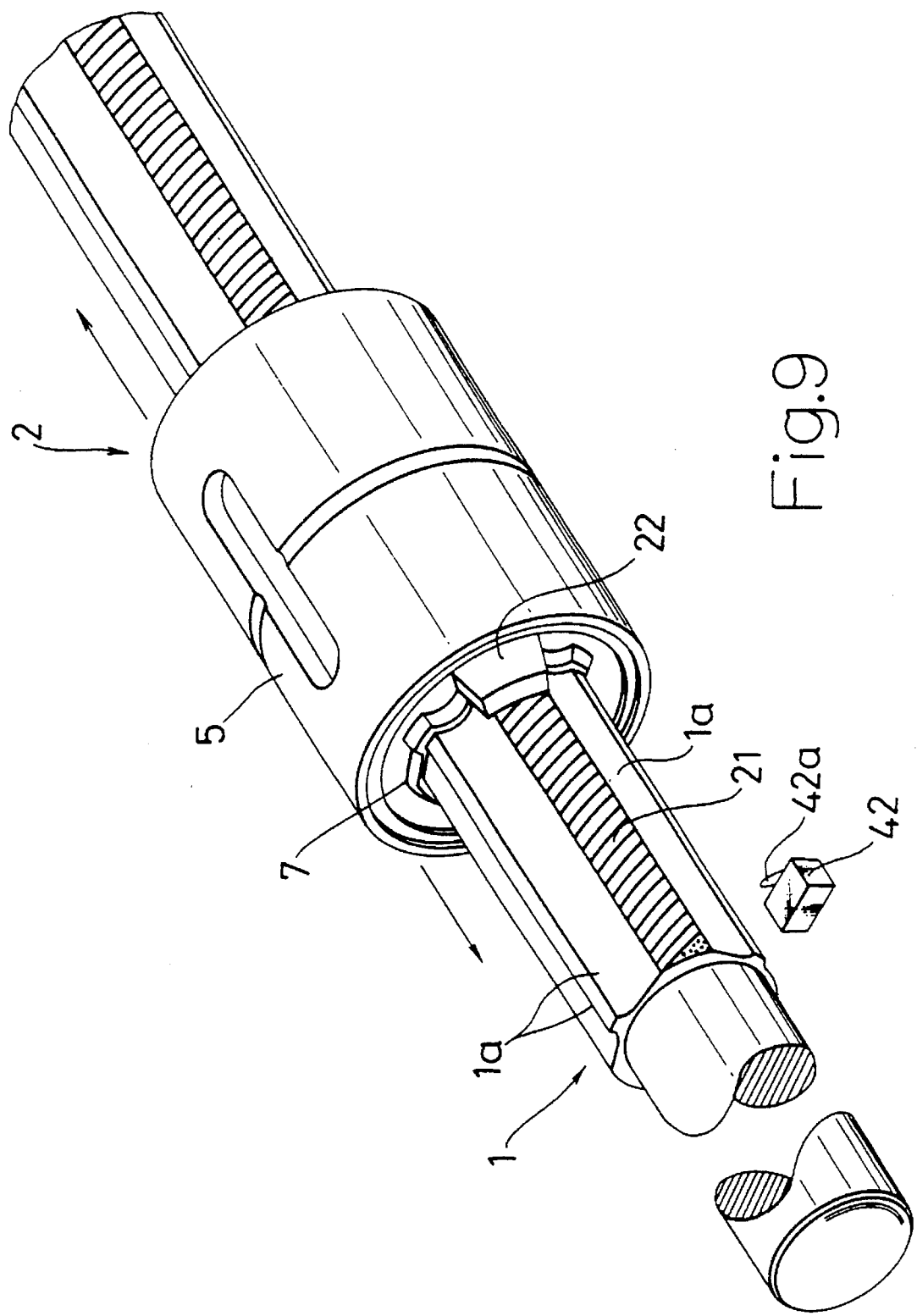
FIG. 9 is a perspective view of a ball spline as a second embodiment of the present invention.
Figure 10:
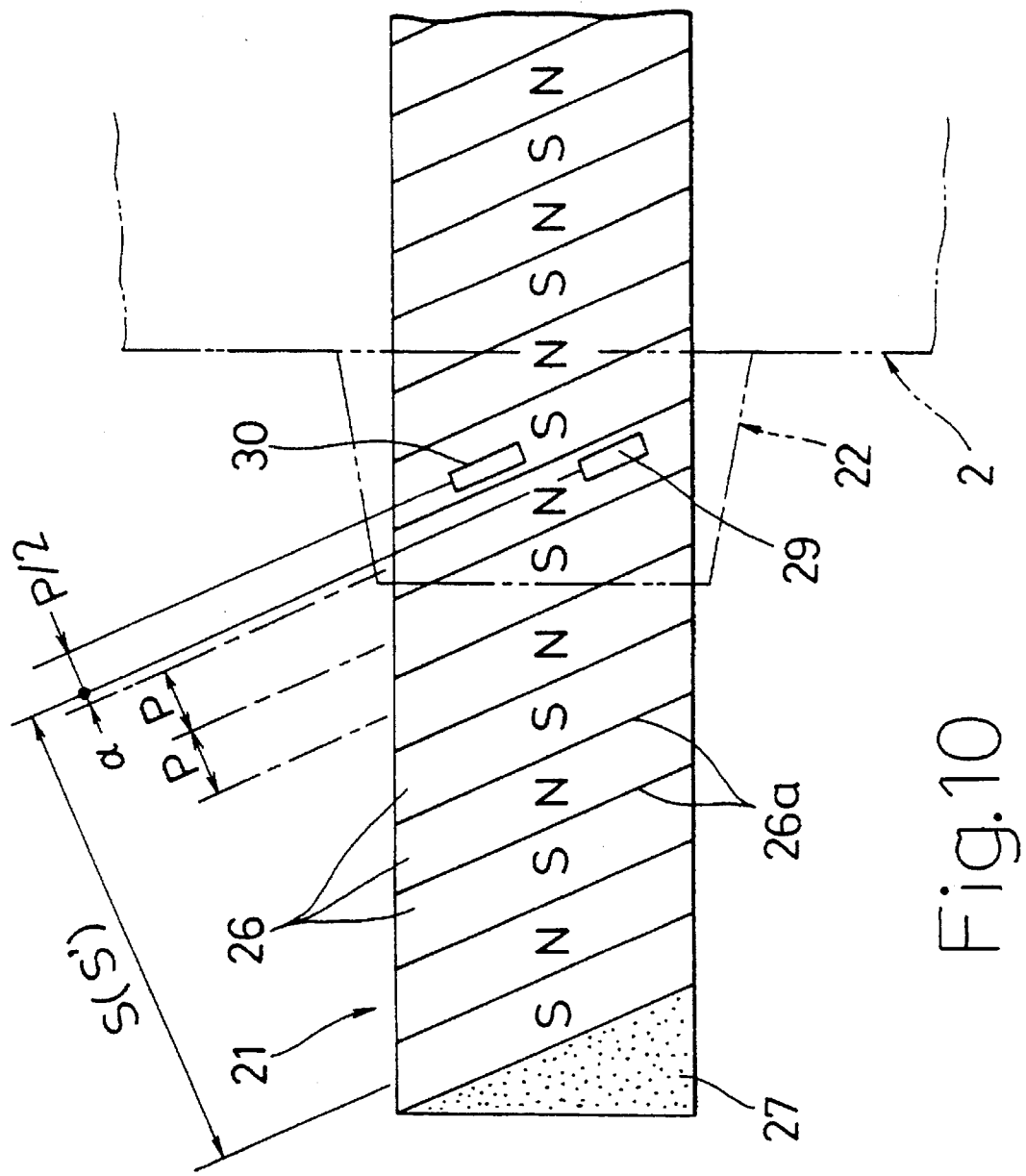
FIG. 10 is an overhead view showing the detected portion provided on the ball spline shown in FIG. 9 along with the detection device for detection of said detected portion.

Continuing, the following provides an explanation of a ball spline as a second embodiment of the present invention with reference to FIGS. 9 and 10. Furthermore, since said ball spline indicated below is composed in the same manner as the ball spline of the first embodiment shown in FIGS. 4 through 7 with the exception of those portions to be explained, the explanation will only focus on those essential portions. In addition, in the following explanation, the same reference numerals will be used for those constituent members identical to the constituent members of the ball spline of the first embodiment. Furthermore, these provisions shall apply similarly with respect to a third embodiment to be described later.

As shown in FIGS. 9 and 10, in said ball spline, borders 26a in the direction along track grooves 1a of spline 1 are intersecting said track grooves 1a for each of magnetized portions 26 for detection of amount of movement provided on detected portion 21.

Thus, in the case of borders 26a of each magnetized portion 26 intersecting track groove 1a, spline shaft 1 is fed by turning in spiraling fashion while alternately switching the magnetic poles of a magnetizing head (not shown) for magnetization. Furthermore, in the case of making borders 26a of each magnetized portion 26 roughly perpendicular to track groove 1a as in the ball spline of the first embodiment previously described, spline shaft 1 should simply be magnetized by changing the magnetic poles of the magnetizing head while moving linearly in the axial direction.

However, in the present embodiment, detection of the reaching of the measurement reference point by outer cylinder 2 is performed by switch 42 shown in FIG. 9. Accordingly, a magnetized portion serving as the origin is not provided on detected portion 21. As a result of employing this constitution, magnetizing work for forming detected portion 21 is completed simply by completing the above-mentioned process. However, a magnetized portion may also be provided to serve as the origin. In this case, after completing magnetization of each magnetized portion 26 for detection of amount of movement in the manner described above, a magnetized portion (similar to magnetized portion 28 in FIG. 6) is provided at one location to serve as the reference for measurement at the origin position after erasing magnetization with a magnetic eraser (not shown) provided only over prescribed width on one side of detected portion 21 shown in FIG. 10. In addition, a magnetic resistance element (not shown) is provided in case 22 for detecting this magnetized portion provided to serve as the origin.

Since the position of outer cylinder 2 is detected in the ball spline as a second embodiment of the present invention having the constitution described above based on the same measuring principle as that of the ball spline of the first embodiment previously described, an explanation regarding said measuring principle and so forth will be omitted. Furthermore, as is clear from FIG. 10, the two electromagnetic conversion elements provided in case 22 for detecting each of magnetized portions 26 are mounted so as to be parallel with each of said magnetized portions 26.

Figure 11:
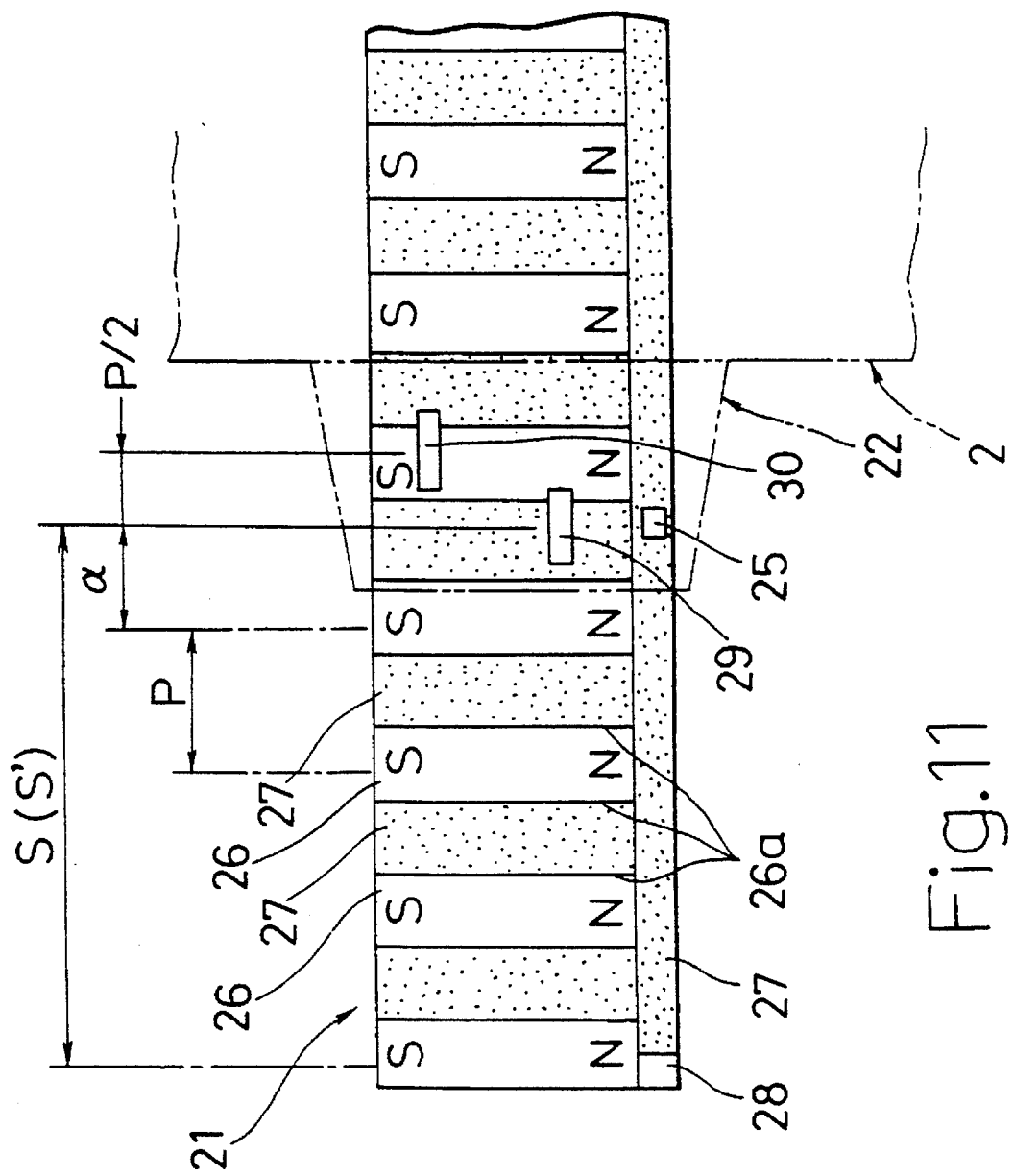
FIG. 11 is an overhead view showing the detected portion provided on a ball spline as a third embodiment of the present invention along with the detection device for detection of said detected portion.

The following provides an explanation of a ball spline as a third embodiment of the present invention based on FIG. 11.

As shown in the drawing, each of magnetized portions 26 for detecting amount of movement are provided with non-magnetized portions 27 sandwiched in between in the present embodiment. Furthermore, in this case, the dimensions of non-magnetized portions 27 in the direction along track groove 1a of spline shaft (refer to FIG. 4) are set to be the same as magnetized portions 26.

Each of magnetized portions 26 are magnetized such that one side in the direction of width of track groove 1a is an N pole while the other side is an S pole.

In contrast to magnetic flux being produced between each of magnetized portions 26 provided adjacent to each other in the constitutions of the first and second embodiments described above, magnetic flux is produced between the N and S poles of each magnetized portion 26 in the constitution of the present embodiment. However, although the density of this magnetic flux reaches a maximum at the central portion of magnetized portion 26 in the direction along track groove 1a, it also extends to the range of adjacent non-magnetized portion 27 while gradually weakening, eventually reaching a minimum at the central portion of said non-magnetized portion 27. Accordingly, each of the waveforms obtained from electromagnetic conversion elements 29 and 30 are also in the form of consecutive positive and negative sine waves, thus allowing amount of movement to be determined based on the same principle as in the first and second embodiments.

However, although a constitution is indicated in the above-mentioned first through third embodiments wherein magnetism is used as a means of detecting the position of outer cylinder 2, a constitution may be employed in other embodiments wherein detection is performed optically. Namely, as shown, for example, in FIG. 11, each of magnetized portions 26, magnetized portion 28 and non-magnetized portions 27 are replaced with reflecting portions, which reflect light, and non-reflecting portions. In addition, electromagnetic conversion element 29, electromagnetic conversion element 30 and magnetic resistance element 25 acting as a detection device are replaced with an optical device such as a reflecting photocoupler. Consequently, in addition to said optical device radiating light, reflected light of said reflecting portions is received to produce a detection signal based on this reflected light received.

Furthermore, the present invention is not limited to the constitutions of each of the embodiments described above, but rather can naturally realize a diversity of constitutions by suitably combining constitutions including each of these embodiments.

In addition, although a constitution is indicated in each of the above-mentioned embodiments wherein balls 3 circulate accompanying movement of outer cylinder 2, rollers may also be used for the rolling elements. In addition, although linear track grooves 1a of spline shaft 1 are shown in each of the above-mentioned embodiments, it goes without saying that the present invention can also be applied in the case of a helical spline wherein track grooves are formed in spiral fashion.

In addition, although a ball spline having 6 track grooves is shown in each of the above-mentioned embodiments, the present invention can be applied to various other ball splines, including those have 2 track grooves and so forth.

Moreover, although two electromagnetic conversion elements 29 and 30 are used for the purpose of assessing the direction of movement of outer cylinder 2 in the constitution for position detection using magnetism as described above, only one electromagnetic conversion element is required in the case it is not necessary to assess direction of movement.

In addition, in cases wherein an extremely high degree of resolution is not required for detection of movement of outer cylinder 2, it is sufficient to merely count the peak value of the magnetism detected by a counter, without performing arithmetic processing on the value of α shown in FIGS. 6, 10 and 11.

As has been explained above, in the spline bearing according to the present invention, since a detected portion composing a position detection device for detecting the relative positions of a spline shaft and an outer cylinder is arranged on a spline shaft, the space occupied by said position detection device is able to be held to an extremely small amount, being essentially equal to only the space occupied by a magnetic sensor serving as the sensor device, thus allowing the present invention to offer the advantage of contributing to reduced size of the apparatus, such as an industrial robot, in which it is to be incorporated.

In addition, since a separate linear scale and so forth used in the prior art is no longer required, the present invention also offers the advantage of achieving reductions in cost.

Moreover, according to the present invention, since the spline shaft itself can act as a scale, the present invention offers the additional advantage of having a high degree of reliability of relative positioning of the spline shaft and outer cylinder.

What is claimed is:

1. A spline bearing comprising: a spline shaft in which tracks are formed in the lengthwise direction; an outer cylinder able to freely perform relative motion with respect to said spline shaft and having rolling element circulating paths containing load bearing tracks corresponding to said tracks; and, a plurality of rolling elements arranged and contained in said rolling element circulating paths, which bear the load while rolling over said tracks; wherein, a detected portion is formed in said spline shaft along said tracks, and a detection device is provided on said outer cylinder which detects said detected portion.

2. The spline bearing as set forth in claim 1 wherein said detected portion comprises the forming of an origin to serve as a reference for measurement.

3. The spline bearing as set forth in claim 1 wherein said detected portion is magnetized by a large number of magnetic poles along said tracks, and said detection device is composed of a magnetic sensor.

4. The spline bearing as set forth in claim 3 wherein magnetic poles differing along said tracks are alternately arranged and magnetized.

5. The spline bearing as set forth in claim 3 wherein a plurality of magnetized portions are arranged along said tracks with non-magnetized portions between each, and each of said magnetized portions is magnetized by having an N pole on one side and an S pole on the other side in the direction of width of said tracks.

6. The spline bearing as set forth in claim 3 wherein borders between each magnetized portion in the direction along said tracks are roughly perpendicular to said tracks.

7. The spline bearing as set forth in claim 3 wherein borders between each magnetized portion in the direction along said tracks intersect said tracks.

8. The spline bearing as set forth in claim 3 wherein said magnetic sensor is composed of electromagnetic conversion elements.

9. The spline bearing as set forth in claim 3 wherein said magnetic sensor is composed of a magnetic resistance element.

10. The spline bearing as set forth in claim 3 wherein a magnetic film is provided on the surface of said spline shaft, and said spline shaft is magnetized by said magnetic film.

11. The spline bearing as set forth in claim 1 wherein said detected portion is composed by arranging a reflecting portion, which reflects light, and a non-reflecting portion, and said detection device is composed of an optical device which, together with radiating light, receives reflected light from said reflecting portion.

12. The spline bearing as set forth in claim 1 wherein said spline bearing is a ball spline.

\* \* \* \* \*